US012576703B2

(12) United States Patent
Downs et al.

(10) Patent No.: US 12,576,703 B2
(45) Date of Patent: Mar. 17, 2026

(54) ELECTRIC DRIVE UNIT WITH MOTOR ASSEMBLY ISOLATED FROM BEAMING LOADS TRANSMITTED THROUGH HOUSING ASSEMBLY

(71) Applicant: AMERICAN AXLE & MANUFACTURING, INC., Detroit, MI (US)

(72) Inventors: James P. Downs, South Lyon, MI (US); Paul J. Valente, Berkley, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 249 days.

(21) Appl. No.: 18/385,033

(22) Filed: Oct. 30, 2023

(65) Prior Publication Data

US 2024/0059132 A1     Feb. 22, 2024

Related U.S. Application Data

(63) Continuation of application No. 18/310,670, filed on May 2, 2023, now Pat. No. 11,845,328.

(51) Int. Cl.
B60K 1/00 (2006.01)
B60K 17/16 (2006.01)
H02K 7/116 (2006.01)

(52) U.S. Cl.
CPC ................ B60K 1/00 (2013.01); B60K 17/16 (2013.01); H02K 7/116 (2013.01); B60K 2001/001 (2013.01)

(58) Field of Classification Search
CPC ..... B60K 1/00; B60K 17/16; B60K 2001/001
See application file for complete search history.

(56) References Cited

U.S. PATENT DOCUMENTS 2,027,218 A * 1/1936 Armington ............... B61C 9/38
                                                    105/100
5,419,406 A * 5/1995 Kawamoto .............. B60K 1/02
                                                    475/5
(Continued)

FOREIGN PATENT DOCUMENTS

CN        108599470        9/2018
CN        112449739 A      3/2021
(Continued)

OTHER PUBLICATIONS

PCT International Search Report dated Apr. 4, 2023 for corresponding PCT application No. PCT/US2022/051149, filed Nov. 29, 2022.
(Continued)

*Primary Examiner* — Erez Gurari
(74) *Attorney, Agent, or Firm* — DICKINSON WRIGHT PLLC

(57) ABSTRACT

An electric drive unit having an electric motor, a differential assembly, a transmission, which transmits rotary power between the electric motor and the differential assembly, a pair of axle shafts, which are drivingly coupled to output members of the differential assembly, and a housing assembly in which the electric motor, the differential assembly, the transmission, and the axle shafts are housed. The electric motor includes a stator, a rotor and a motor housing that houses the stator and the rotor. The motor housing is fixedly coupled the housing assembly. Bending loads transmitted through the motor housing are not transmitted through the electric motor.

20 Claims, 15 Drawing Sheets

(56)     References Cited

U.S. PATENT DOCUMENTS

| | | | |
|---|---|---|---|
| 5,443,130 A * | 8/1995 | Tanaka | H02K 7/116 |
| | | | 180/65.6 |
| 5,587,882 A | 12/1996 | Patel | |
| 6,930,417 B2 | 8/2005 | Kaneko et al. | |
| 7,525,224 B2 | 4/2009 | Takenaka et al. | |
| 7,610,979 B1 | 11/2009 | Dykowski et al. | |
| 7,641,490 B2 | 1/2010 | Korich et al. | |
| 7,775,060 B2 | 8/2010 | Nakajima et al. | |
| 8,403,088 B2 * | 3/2013 | Knoblauch | B60L 15/2054 |
| | | | 180/65.7 |
| 8,937,414 B2 | 1/2015 | Song et al. | |
| 9,030,063 B2 | 5/2015 | Rawlinson et al. | |
| 9,692,277 B2 | 6/2017 | Pearce, Jr. et al. | |
| 10,236,791 B1 | 3/2019 | Chung et al. | |
| 10,411,574 B2 | 9/2019 | Nakashima et al. | |
| 10,464,439 B2 | 11/2019 | Liu et al. | |
| 10,696,149 B2 | 6/2020 | Pearce, Jr. et al. | |
| 10,808,834 B2 * | 10/2020 | Soffner | B60K 17/16 |
| 11,161,399 B2 | 11/2021 | Matt | |
| 11,303,183 B2 | 4/2022 | Downs et al. | |
| 2005/0211490 A1 | 9/2005 | Shimizu et al. | |
| 2009/0211824 A1 * | 8/2009 | Knoblauch | H02K 7/116 |
| | | | 180/65.7 |
| 2012/0040795 A1 | 2/2012 | Platt et al. | |
| 2012/0098391 A1 | 4/2012 | Yamasaki et al. | |
| 2013/0001002 A1 | 1/2013 | Platt et al. | |
| 2013/0278090 A1 | 10/2013 | Matsuo | |
| 2013/0285485 A1 | 10/2013 | Song et al. | |
| 2014/0265659 A1 | 9/2014 | Chamberlin et al. | |
| 2016/0105081 A1 | 4/2016 | Bradfield | |
| 2016/0172939 A1 | 6/2016 | Owen | |
| 2016/0276895 A1 | 9/2016 | Aizawa et al. | |
| 2016/0285335 A1 | 9/2016 | Watanabe et al. | |
| 2017/0057349 A1 * | 3/2017 | Ogawa | F16H 57/037 |
| 2017/0077779 A1 | 3/2017 | Hanioka et al. | |
| 2017/0331356 A1 | 11/2017 | Nakashima | |
| 2018/0262089 A1 | 9/2018 | Hatch | |
| 2018/0297401 A1 * | 10/2018 | Liu | B60K 1/02 |
| 2019/0331132 A1 | 10/2019 | Guntermann et al. | |
| 2019/0375305 A1 * | 12/2019 | Matt | H02K 11/0094 |
| 2020/0149624 A1 | 5/2020 | Hata et al. | |
| 2020/0227334 A1 | 7/2020 | Hart et al. | |
| 2020/0244138 A1 | 7/2020 | Fröhlich et al. | |
| 2020/0331343 A1 | 10/2020 | Takahashi et al. | |
| 2020/0406682 A1 * | 12/2020 | Ogawa | B21D 53/90 |
| 2021/0066157 A1 | 3/2021 | Manninen et al. | |
| 2021/0138885 A1 * | 5/2021 | Engerman | B60K 17/16 |
| 2021/0293327 A1 | 9/2021 | Wilson et al. | |
| 2021/0394600 A1 | 12/2021 | Absenger et al. | |
| 2022/0037954 A1 | 2/2022 | Downs et al. | |
| 2022/0056992 A1 | 2/2022 | Itou et al. | |
| 2022/0135007 A1 * | 5/2022 | Schidlowski | B60K 1/00 |
| | | | 188/2 R |
| 2022/0355655 A1 * | 11/2022 | Fang | F16H 3/666 |
| 2022/0385146 A1 * | 12/2022 | Downs | B60K 1/00 |
| 2023/0110432 A1 * | 4/2023 | Laforce | F16H 57/029 |
| | | | 310/54 |
| 2023/0128748 A1 * | 4/2023 | Umerley | B60K 17/16 |
| | | | 180/65.1 |
| 2023/0264554 A1 * | 8/2023 | Downs | H02K 7/14 |
| | | | 180/65.6 |
| 2023/0392672 A1 * | 12/2023 | Cattoor | B60K 17/08 |
| 2024/0100936 A1 * | 3/2024 | Trudel | B60K 11/02 |
| 2025/0003489 A1 * | 1/2025 | Lenon | B60K 1/00 |
| 2025/0083475 A1 * | 3/2025 | Waltz | F16H 57/021 |
| 2025/0100364 A1 * | 3/2025 | Windom | B60K 17/02 |
| 2025/0136068 A1 * | 5/2025 | Pavuk | B60K 17/165 |
| 2025/0303795 A1 * | 10/2025 | Waltz | B60K 17/16 |

FOREIGN PATENT DOCUMENTS

| | | |
|---|---|---|
| DE | 102017214490 | 2/2019 |
| DE | 102018111624 | 11/2019 |
| EP | 3519221 B1 | 2/2021 |
| GB | 2574018 | 11/2019 |
| GB | 2574019 | 11/2019 |
| GB | 2574020 | 11/2019 |
| JP | H0129791 | 5/1997 |
| JP | 2001060750 | 3/2001 |
| JP | 2008184111 | 8/2008 |
| JP | 2012074440 | 4/2012 |
| JP | 5256117 B2 | 8/2013 |
| JP | 2016144382 | 8/2016 |
| KR | 1020140057032 | 5/2014 |
| WO | WO1996019827 | 6/1996 |
| WO | WO2018030343 | 2/2018 |
| WO | WO2018138530 | 8/2018 |
| WO | WO2019208081 | 10/2019 |
| WO | WO2019208083 | 10/2019 |
| WO | WO2019208084 | 10/2019 |
| WO | 2020069744 A1 | 4/2020 |
| WO | WO2020160785 | 8/2020 |
| WO | WO2020209324 | 10/2020 |
| WO | WO2020219955 | 10/2020 |
| WO | WO2022197513 | 9/2022 |

OTHER PUBLICATIONS

International Preliminary Report On Patentability for International Application No. PCT/US2022/051149 dated May 2, 2024 (5 pages).

* cited by examiner

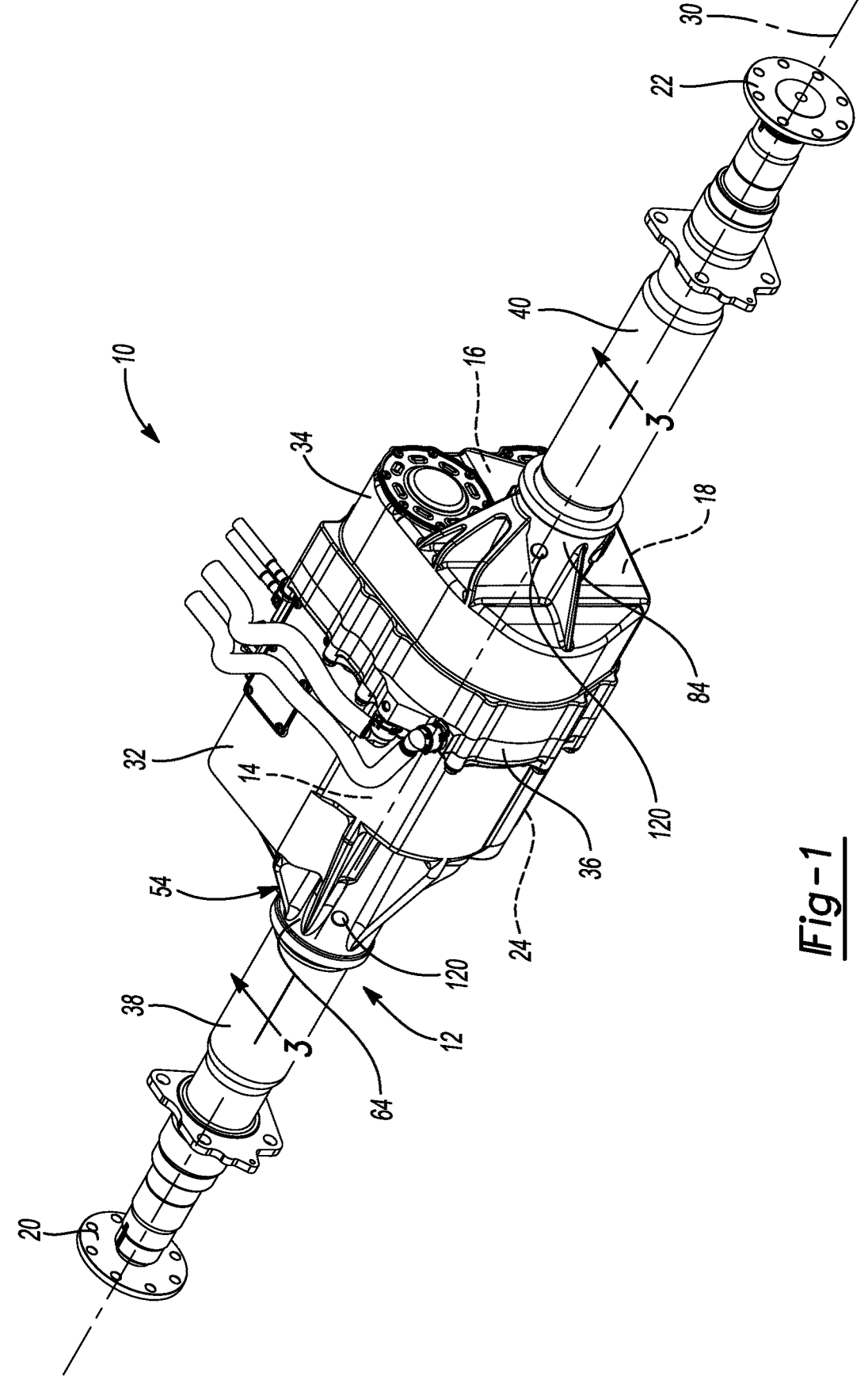
_Fig-1_

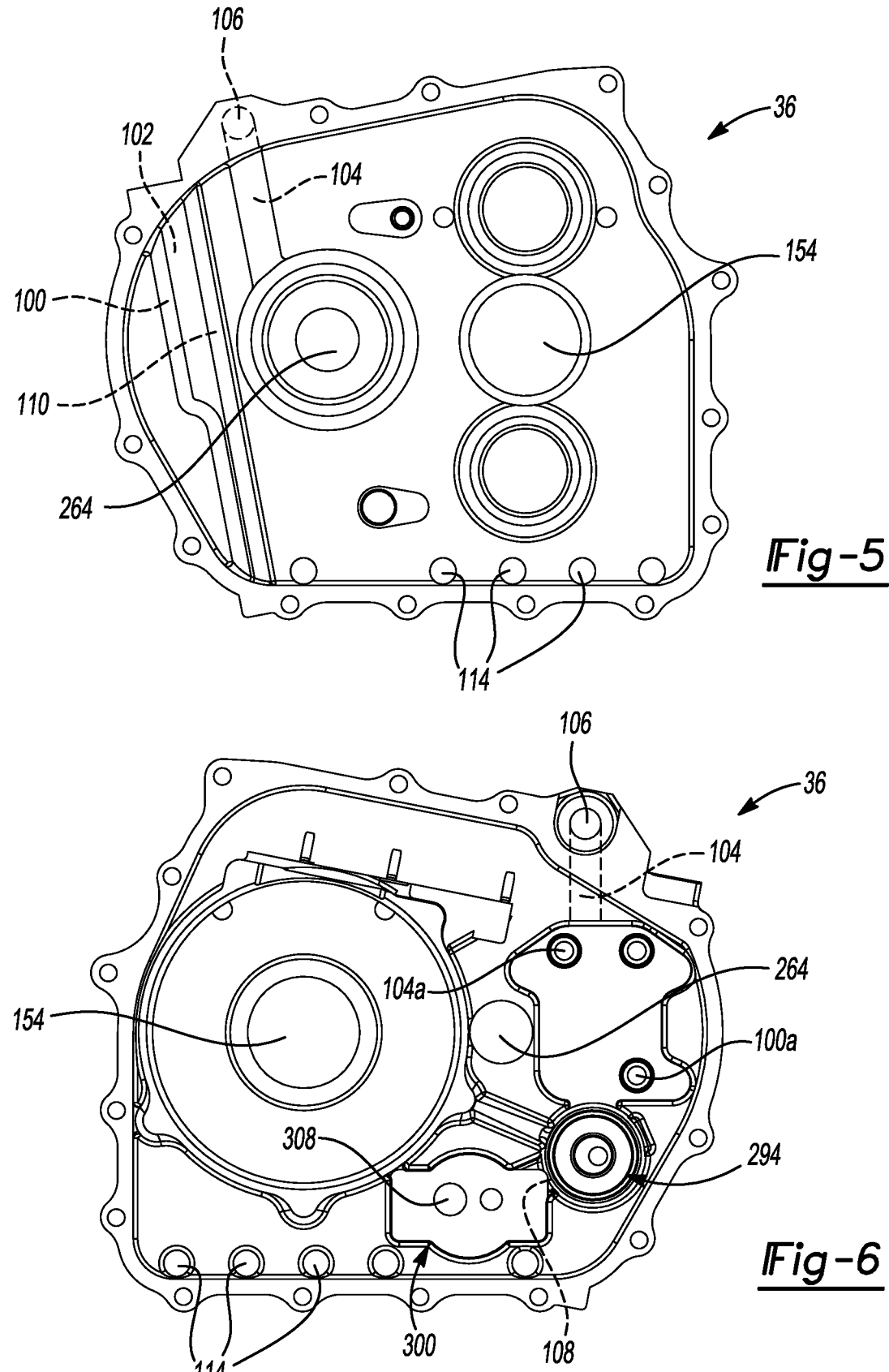
_Fig-5_
_Fig-6_

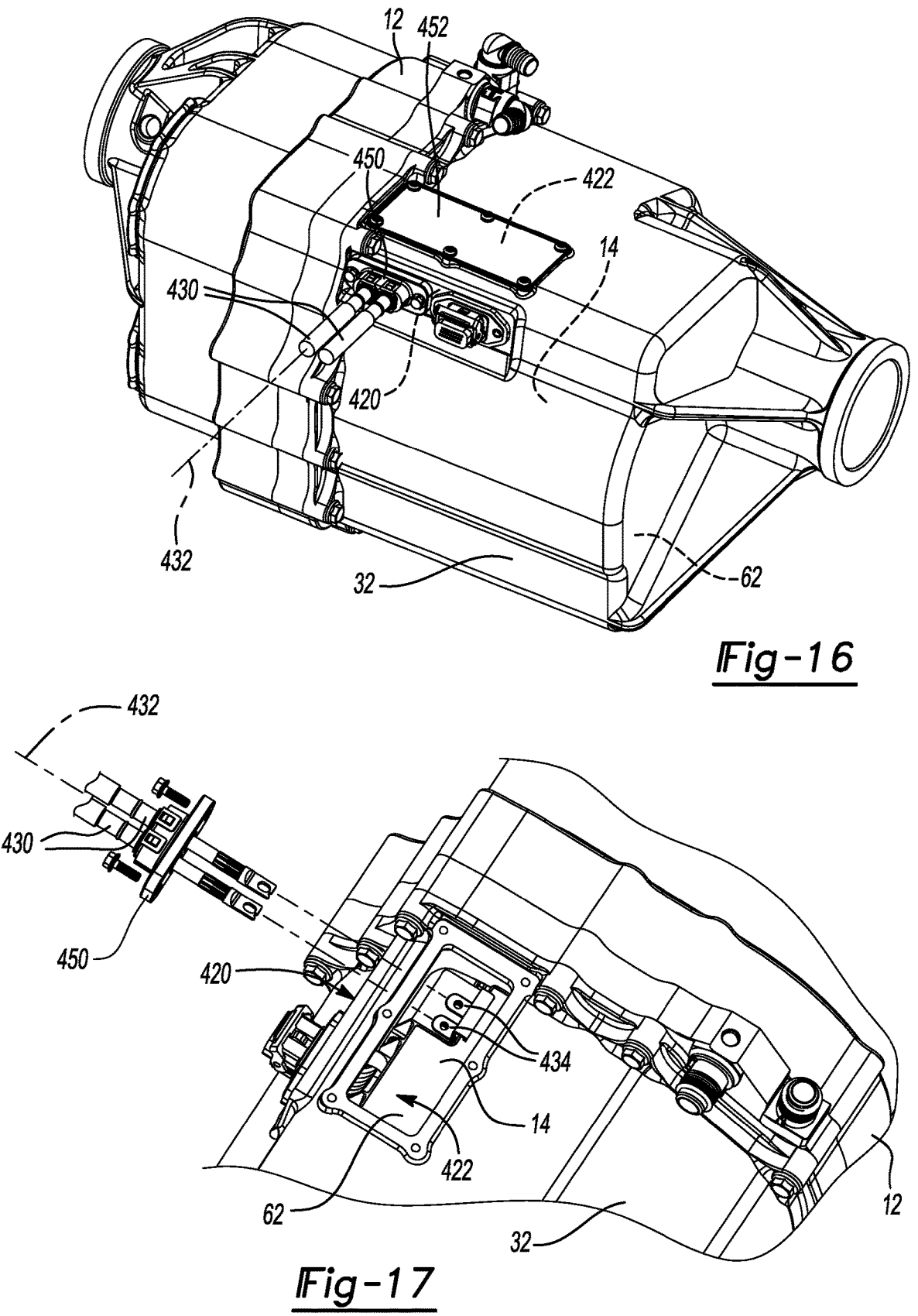
_Fig-16_
_Fig-17_

ELECTRIC DRIVE UNIT WITH MOTOR ASSEMBLY ISOLATED FROM BEAMING LOADS TRANSMITTED THROUGH HOUSING ASSEMBLY

CROSS-REFERENCE TO RELATED APPLICATIONS

This application is a continuation of U.S. application Ser. No. 18/310,670 filed May 2, 2023, which is a bypass continuation of PCT Application No. PCT/US2022/051149 filed Nov. 29, 2022, which claims the benefit of U.S. Provisional Application No. 63/264,743 filed Dec. 1, 2021. The disclosure of each of the above-identified applications is incorporated by reference as if fully set forth in detail herein.

FIELD

The present disclosure relates to an electric drive unit having a motor assembly that is isolated from beaming loads that are transmitted through a housing assembly of the electric drive unit.

BACKGROUND

This section provides background information related to the present disclosure which is not necessarily prior art.

One approach to the electrification of a vehicle driveline involves the incorporation of an electric motor into an electric drive unit in such a manner that the housing of the electric motor is also a structural element of the electric drive unit. More specifically, such configurations transmit beaming loads (i.e., vertical loads that would cause bending of a beam axle at one or more locations between a pair of driven wheels) longitudinally through the electric motor. Configuration in this manner can help to reduce the weight of the electric drive unit and/or permit the electric motor to be more easily integrated/packaged into the electric drive unit. While such an approach is relatively commonplace in the modern trend toward the electrification of vehicles, we have noted some drawbacks.

One such drawback concerns the cyclic application of bending stresses onto components of the electric motor and related considerations for the effects of fatigue on the durability of the electric drive unit. Another such drawback concerns the risk of damage to components of a cooling system, such as a pump or heat exchanger, if such components are mounted to the exterior of the housing assembly of the electric drive unit. In this regard, there is a risk that such externally-mounted components could potentially be damaged if they struck an object during the operation of a vehicle that is equipped with the electric drive unit.

SUMMARY

This section provides a general summary of the disclosure, and is not a comprehensive disclosure of its full scope or all of its features.

In one form, the present disclosure provides an electric drive unit that includes a housing assembly, a motor assembly, a transmission, a differential assembly and first and second output shaft members. The housing assembly defines an output axis and includes a first end cover, a second end cover, an intermediate housing member, a first axle tube and a second axle tube. The first end cover has a first perimeter wall member and a first axle tube mount. The first perimeter wall member defines a first cavity that is disposed about and extends longitudinally along the output axis. The first axle tube mount defines a first axle tube bore. The second end cover has a second perimeter wall member and a second axle tube mount. The second perimeter wall member defines a second cavity that is disposed about and extends longitudinally along the output axis. The second axle tube mount defines a second axle tube bore. The intermediate housing member is disposed between and is fixedly coupled to the first and second end covers. The first axle tube is received in the first axle tube bore and is fixedly coupled to the first axle tube mount. The second axle tube is received in the second axle tube bore and is fixedly coupled to the second axle tube mount. The motor assembly has a motor housing, a stator, a rotor and a motor output shaft. The motor housing is fixedly coupled to the intermediate housing member and extends into the first cavity. The motor housing is spaced apart from the first perimeter wall member and the first axle tube mount. The motor housing defines a motor cavity into which the stator is disposed. The rotor is disposed in the stator for rotation relative to the stator about a motor axis. The motor output shaft is coupled to the rotor for rotation therewith. The motor output shaft extends through the intermediate housing member and into the second cavity. The transmission is disposed in the second cavity and includes a transmission input member, which is coupled to the motor output shaft for rotation therewith, and a transmission output member that is rotatable about the output axis. The differential assembly is disposed in the second cavity and includes a differential input member, which is coupled to the transmission output member for rotation therewith, and a pair of differential output members. The first output shaft member is received in the first axle tube and is rotatably coupled to a first one of the pair of differential output members. The second output shaft member is received in the second axle tube and is rotatably coupled to the other one of the pair of differential output members.

In another form, the present disclosure provides an electric drive unit that includes a housing assembly, a motor assembly, a transmission, a differential assembly, and first and second output shaft members. The housing assembly defines an output axis and includes an intermediate housing member, a first axle tube and a second axle tube. The housing assembly defines a first cavity and a second cavity that is segregated from the first cavity by the intermediate housing member. The motor assembly has a motor housing, a stator, a rotor and a motor output shaft. The motor housing is fixedly coupled to the intermediate housing member and extends into the first cavity. The motor housing defines a motor cavity. The stator is disposed in the motor cavity. The rotor is disposed in the stator for rotation relative to the stator about a motor axis. The motor output shaft is coupled to the rotor for rotation therewith. The motor output shaft extends through the intermediate housing member and into the second cavity. The transmission is disposed in the second cavity and has a transmission input member, which is coupled to the motor output shaft for rotation therewith, and a transmission output member that is rotatable about the output axis. The differential assembly is disposed in the second cavity and has a differential input member, which is coupled to the transmission output member for rotation therewith, and a pair of differential output members. The first output shaft member is received in the first axle tube and is rotatably coupled to a first one of the pair of differential output members. The second output shaft member is received in the second axle tube and is rotatably coupled to the other one of the pair of differential output members.

Bending loads transmitted through the housing assembly along the output axis are not transmitted through the stator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an exemplary electric drive unit constructed in accordance with the teachings of the present disclosure;

FIG. 5 is an elevation view of a portion of the electric drive unit of FIG. 1, illustrating an intermediate housing member in more detail;

FIG. 6 is an elevation view of a portion of the electric drive unit of FIG. 1, illustrating the intermediate housing member, a motor housing, a pump mount and a filter mount in more detail;

FIG. 16 is a perspective view of a portion of the electric drive unit of FIG. 1 illustrating a power connection port and an access port in a housing assembly; and FIG. 17 is a perspective view of a portion of the electric drive unit of FIG. 1 with a pair of power cable leads and an access cover removed from the housing assembly to better illustrate the power connection port and the access port.

Corresponding reference numerals indicate corresponding parts throughout the several views of the drawings.

DETAILED DESCRIPTION

Figure 2A:
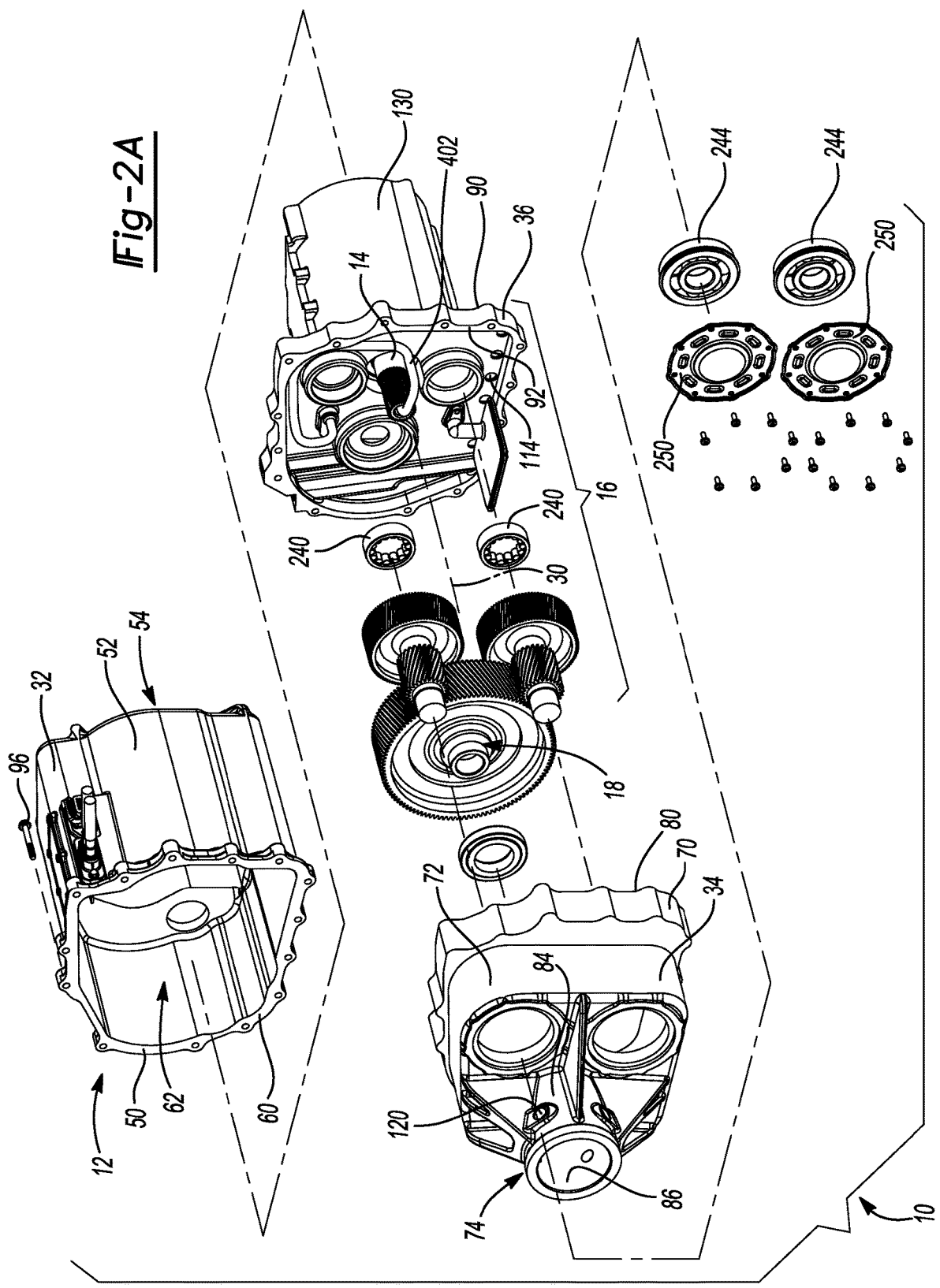
FIGS. 2A and 2B are exploded perspective views of the electric drive unit of FIG. 1.
Figure 2B:
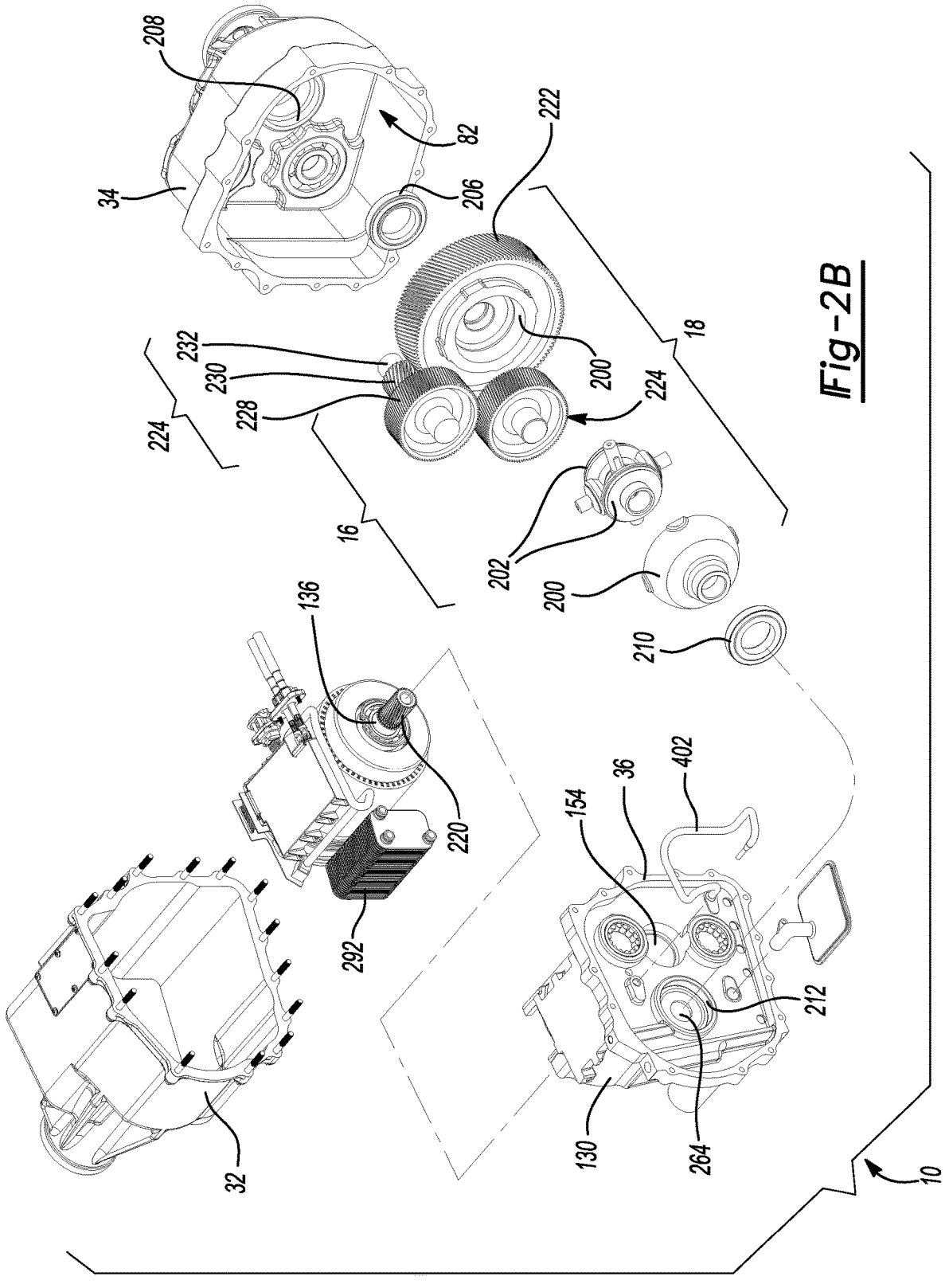
Figure 3:
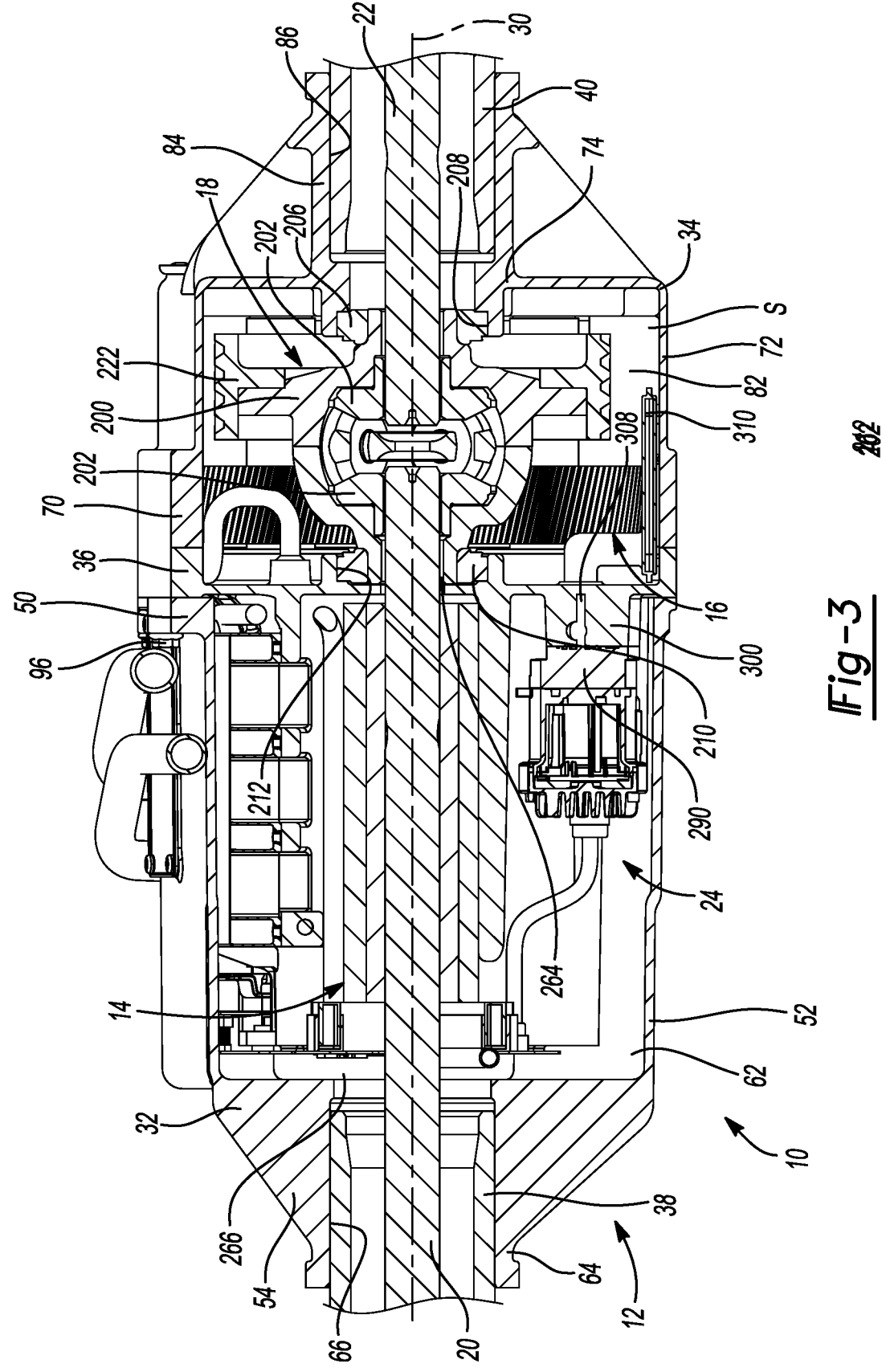
FIG. 3 is a section view taken along the line 3-3 of FIG. 1.

With reference to FIGS. 1 through 3, an electric drive unit constructed in accordance with the teachings of the present disclosure is generally indicated by reference numeral 10. The electric drive unit 10 can include a housing assembly 12, a motor assembly 14, a transmission 16, a differential assembly 18, first and second output shaft members 20 and 22, respectively, and a lubrication and cooling system 24.

The housing assembly 12 can define an output axis 30 and can have a first end cover 32, a second end cover 34, an intermediate housing member 36, a first axle tube 38 and a second axle tube 40.

Figure 4:
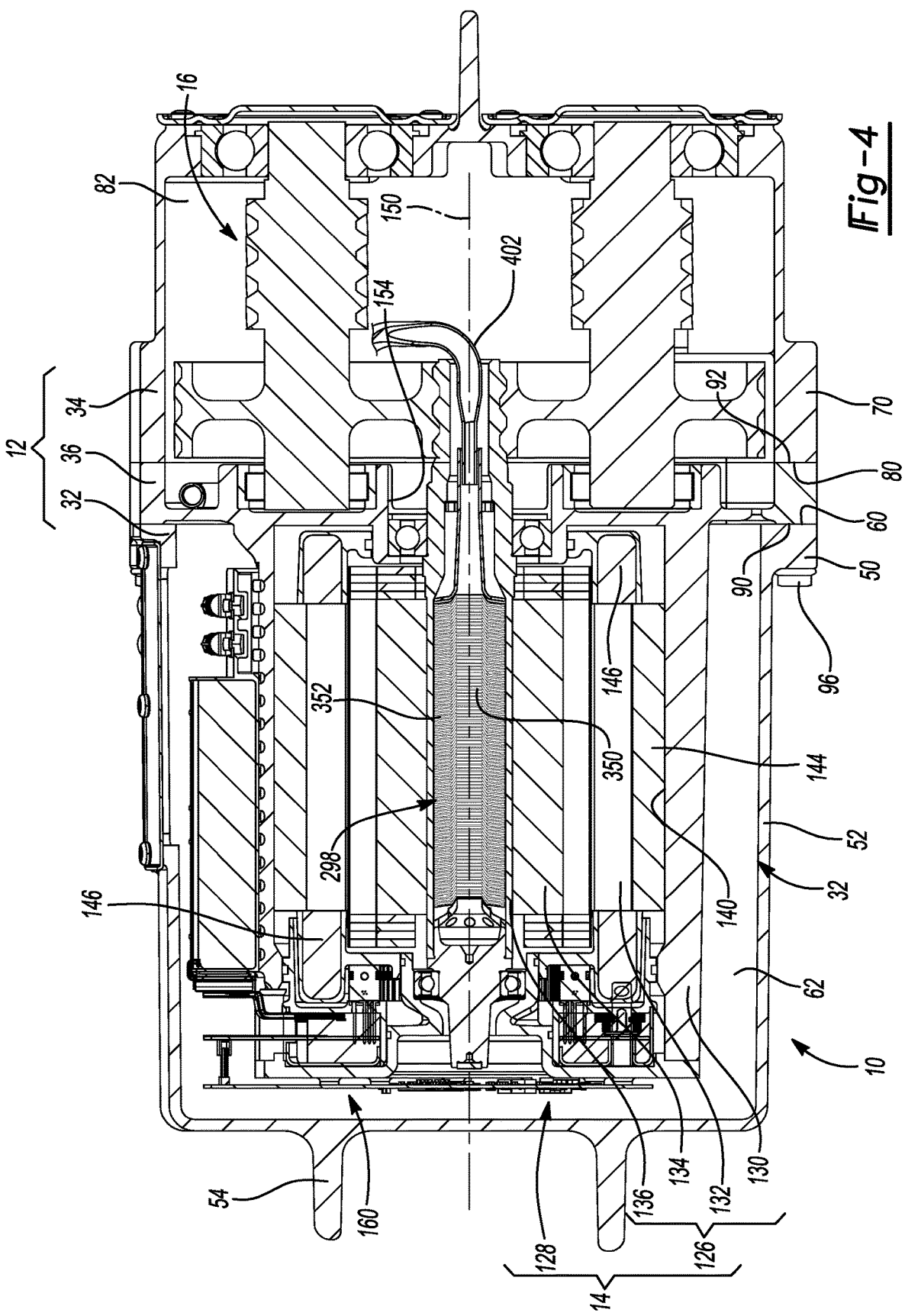
FIG. 4 is a section view of the electric drive unit of FIG. 1 taken along a rotational axis of the rotor of the electric motor.

With reference to FIGS. 2 through 4, the first end cover 32 can have a first mounting flange 50, a first perimeter wall member 52 and a first axle tube mount 54. The first mounting flange 50 can have a first abutting face 60. The first perimeter wall member 52 can extend from a side of the first mounting flange 50 that is opposite the first abutting face 60 and can define a first cavity 62 that can be disposed about and extend longitudinally along the output axis 30. The first axle tube mount 54 can be coupled to an end of the first perimeter wall member 52 that is opposite the first mounting flange 50 and can close the first cavity 62. The first axle tube mount 54 can include a first tubular projection 64 that can define a first axle tube bore 66. The first axle tube bore 66 can be disposed concentrically about the output axis 30.

The second end cover 34 can have a second mounting flange 70, a second perimeter wall member 72 and a second axle tube mount 74. The second mounting flange 70 can have a second abutting face 80. The second perimeter wall member 72 can extend from a side of the second mounting flange 70 that is opposite the second abutting face 80 and can define a second cavity 82 that can be disposed about and extend longitudinally along the output axis 30. The second axle tube mount 74 can be coupled to an end of the second perimeter wall member 72 that is opposite the second mounting flange 70 and can close the second cavity 82. The second axle tube mount 74 can include a second tubular projection 84 that can define a second axle tube bore 86. The second axle tube bore 86 can be disposed concentrically about the output axis 30.

The intermediate housing member 36 is disposed between and is fixedly coupled to the first and second end covers 32 and 34. In the example provided, the intermediate housing member 36 has third and fourth abutting faces 90 and 92, respectively that are abutted against the first and second abutting faces 60 and 80, respectively. A plurality of threaded fasteners 96 are fitted through holes (not specifically shown) in the first mounting flange 50 and the intermediate housing member 36 and are threaded into holes (not specifically shown) in the second mounting flange 70.

Figure 7:
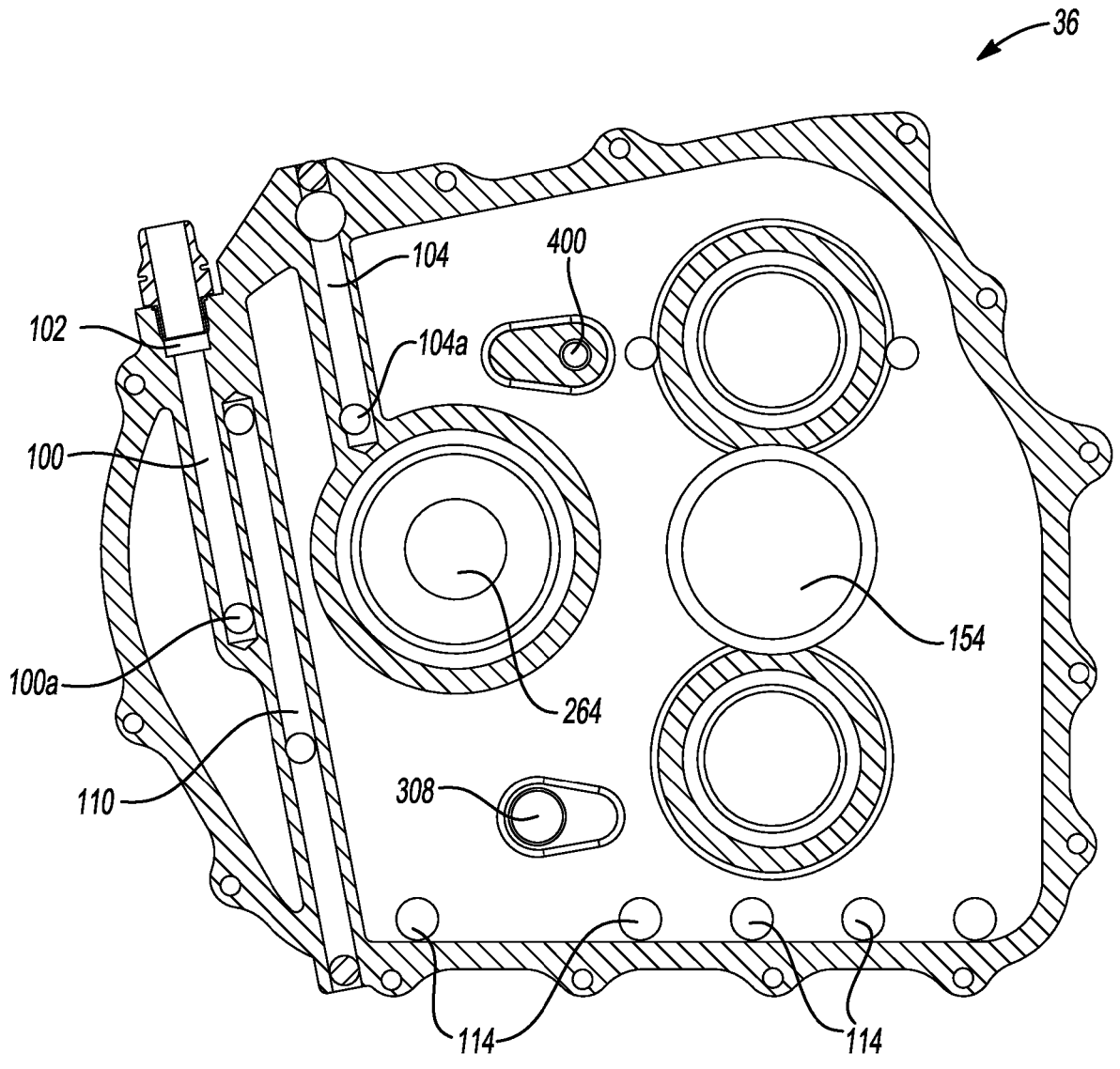
FIG. 7 is a section view taken through the intermediate housing member.

With reference to FIGS. 5 through 7, the intermediate housing member 36 can have a first fluid conduit 100, which can define a coolant inlet port 102, a second fluid conduit 104, which can define a coolant outlet port 106, a third fluid conduit 108, and a fourth fluid conduit 110. A plurality of transfer ports 114 can be formed through the intermediate housing member 36 to permit fluid communication between the first cavity 62 (FIG. 3) and the second cavity 82 (FIG. 3).

Returning to FIGS. 1 and 3, the first axle tube 38 is received in the first axle tube bore 66 and is fixedly coupled to the first axle tube mount 54, while the second axle tube 40 is received in the second axle tube bore 86 and is fixedly coupled to the second axle tube mount 74. In the example provided, the first and second axle tubes 38 and 40 are press-fit to the first and second axle tube bores 66 and 86, respectively, and a plurality of slug welds (not specifically shown) are disposed in weld slug apertures 120 that are formed through the first and second tubular projections 64 and 84.

Figures 14, 15:
FIG. 14 is a section view of a portion of the electric drive unit of FIG. 1 illustrating a fluid connection between a heat exchanger of the lubrication and cooling system with an inverter of an electric motor assembly.
FIG. 15 is a section view of a portion of the electric drive unit of FIG. 1 illustrating the construction of an electric motor of the motor assembly and a rotor heat exchanger of the lubrication and cooling system.

In FIG. 4, the motor assembly 14 can include an electric motor 126 and a motor controller 128. The electric motor 126 can include a motor housing 130, a stator 132, a rotor 134 and a motor output shaft 136. The motor housing 130 is fixedly coupled to the intermediate housing member 36 and extends from the intermediate housing member 36 into the first cavity 62. The motor housing 130 could be formed as a discrete component that is fastened to the intermediate housing member 36, but in the example provided, the motor housing 130 is unitarily and integrally formed with the intermediate housing member 36. The motor housing 130 is spaced apart from and does not touch either the first perimeter wall member 52 or the first axle tube mount 54. The motor housing 130 defines a motor cavity 140 into which the stator 132 is received. The stator 132 includes a stator body 144 and a plurality of windings 146. The stator body 144 defines a plurality of stator coolant channels 148 (FIG. 15). The rotor 134 is disposed in the stator 132 for rotation relative to the stator 132 about a motor axis 150. The motor output shaft 136 is coupled to the rotor 134 for rotation therewith. The motor output shaft 136 extends through a shaft bore 154, which is formed through the intermediate housing member 36, and into the second cavity 82.

Figure 8:
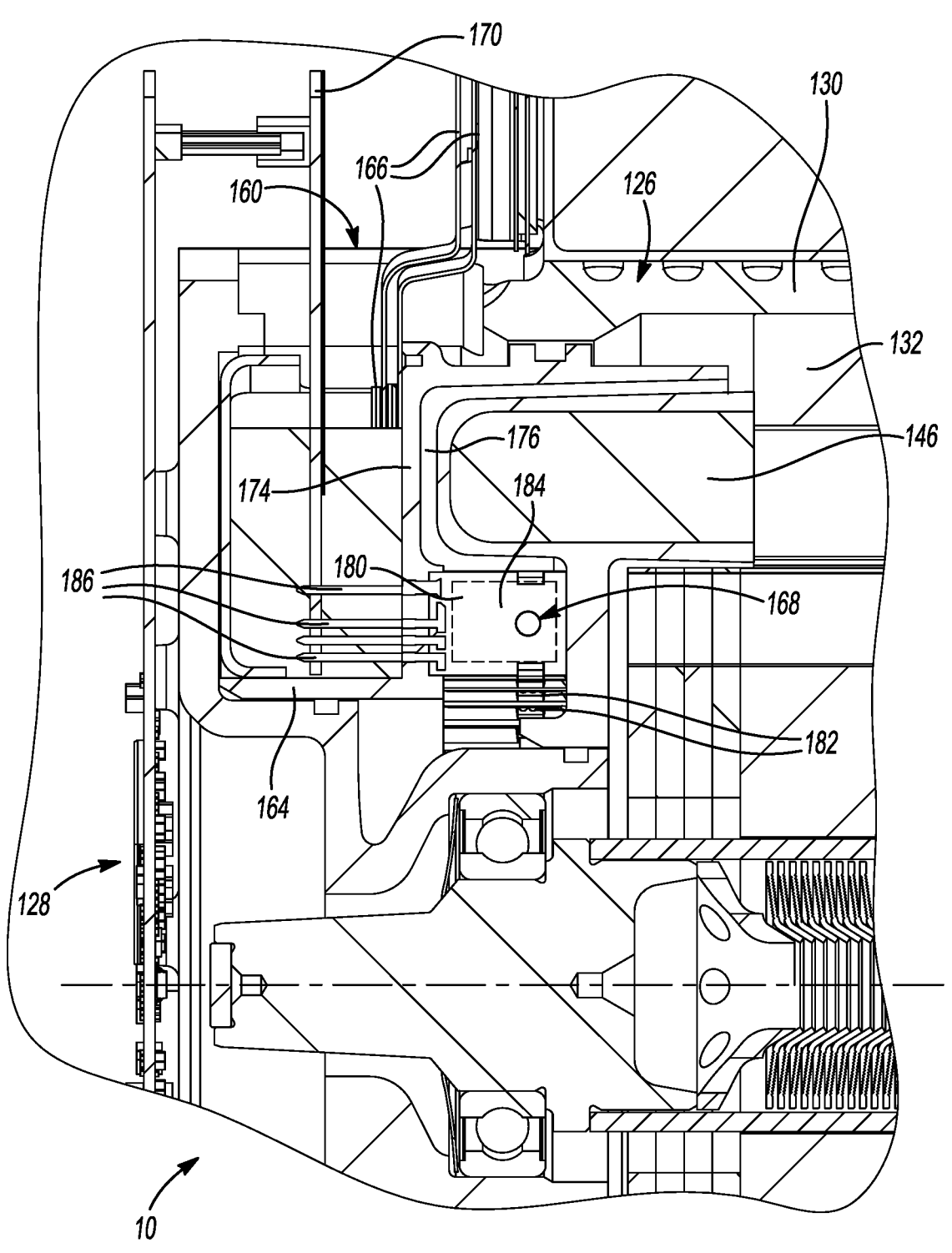
FIG. 8 is an enlarged portion of FIG. 4 illustrating a motor controller of a motor assembly in more detail.

With reference to FIG. 8, the motor controller 128 can include an inverter 160 that is configured to control the supply of electrical power to each of the (phases of the) windings 146 in the stator 132. Details of the inverter 160 can be found in co-pending U.S. application Ser. No. 17/501, 189 filed Oct. 14, 2021 entitled "Electric Drive Module", U.S. Provisional Application No. 63/209,588 filed Jun. 11, 2021 entitled "Electric Drive Module Having A Motor Control Unit With An Inverter That Is Mounted On An Electric Motor", and U.S. Provisional Application No. 63/161,164 filed Mar. 15, 2021 entitled "Electric Drive Unit". Briefly, the inverter 160 includes an inverter mount 164, a plurality of busbars 166, a plurality of heat-sinked power semiconductors 168, and a circuit board assembly 170. The inverter mount 164 is sealingly coupled to the motor housing 130 and houses the heat-sinked power semiconductors 168, the busbars 166 and the circuit board assembly 170. The inverter mount 164 includes a base 174 that segregates the busbars 166 and the circuit board assembly 170 from a coolant passage 176. The busbars 166 include a positive busbar, which is electrically coupled to a source of electrical power, ground busbar, which is coupled to an electric ground, and a plurality of phase busbars. Each of the phase busbars is electrically coupled to a phase or set of the windings 146 of the stator 132. Each of the heat-sinked power semiconductors 168 includes a power semiconductor 180, such as a MOSFET or an IGBT, and a heat sink 182 that is fixedly and thermally coupled to the power semiconductor 180. The power semiconductors 180 have a semiconductor die 184 and a plurality of leads 186 that are electrically coupled to the semiconductor die 184. The semiconductor die 184 and the heat sinks 186 are disposed in the coolant passage 176 and the leads 186 extend through the base 174 of the inverter mount 164 and are electrically coupled to the circuit board assembly 170 and the busbars 166. The inverter 160 is configured to control the amplitude and frequency of the power supplied to the windings 146 of the stator 132 to operate the electric motor 126. More specifically, the inverter 160 employs the heat-sinked power semiconductors 168 to control the switching of DC electricity to create three AC electric outputs, where each AC electric output is associated with a given phase of the windings 146 of the stator 132.

In FIGS. 1, 2B and 3, the differential assembly 18 can be configured in any desired manner to permit or selectively permit speed differentiation between the first and second output shaft members 20 and 22. Generally, the differential assembly 18 can include a differential input member 200 and a pair of differential output members 202. In the example provided, the differential assembly 18 is an open differential assembly, the differential assembly includes a straight bevel differential gearset, the differential input member 200 is a differential case, and the differential output members 202 are side gears of the straight bevel differential gearset. It will be appreciated, however, that any desired means for providing (or selectively providing) speed differentiation between a pair of differential output members can be employed. In this regard, the differential assembly 18 could employ a helical differential gearset having pairs of meshing helical pinions, a planetary (epicyclic) gearset, or one or more friction clutches, and/or could be configured to provide limited slip, locking and/or disconnecting functionality.

The differential assembly 18 can be received in the second cavity 82. A first differential bearing 206 can be received in a first differential bearing bore 208 that is formed in the second end cover 34, while a second differential bearing 210 can be received in a second differential bearing bore 212 that is formed in the intermediate housing member 36. The first and second differential bearings 206 and 210 can support the differential input member 200 for rotation about the output axis 30 relative to the housing assembly 12. In the example provided, the first and second differential bearings 206 and 210 are mounted directly to the differential input member 200 (i.e., the differential case), but it will be appreciated that the first and second differential bearings 206 and 210 could be mounted to an element of the transmission 16 or to an associated one of the first and second output shaft members 20 and 22 so as to indirectly support the differential input member 200 for rotation about the output axis 30.

Figure 9:
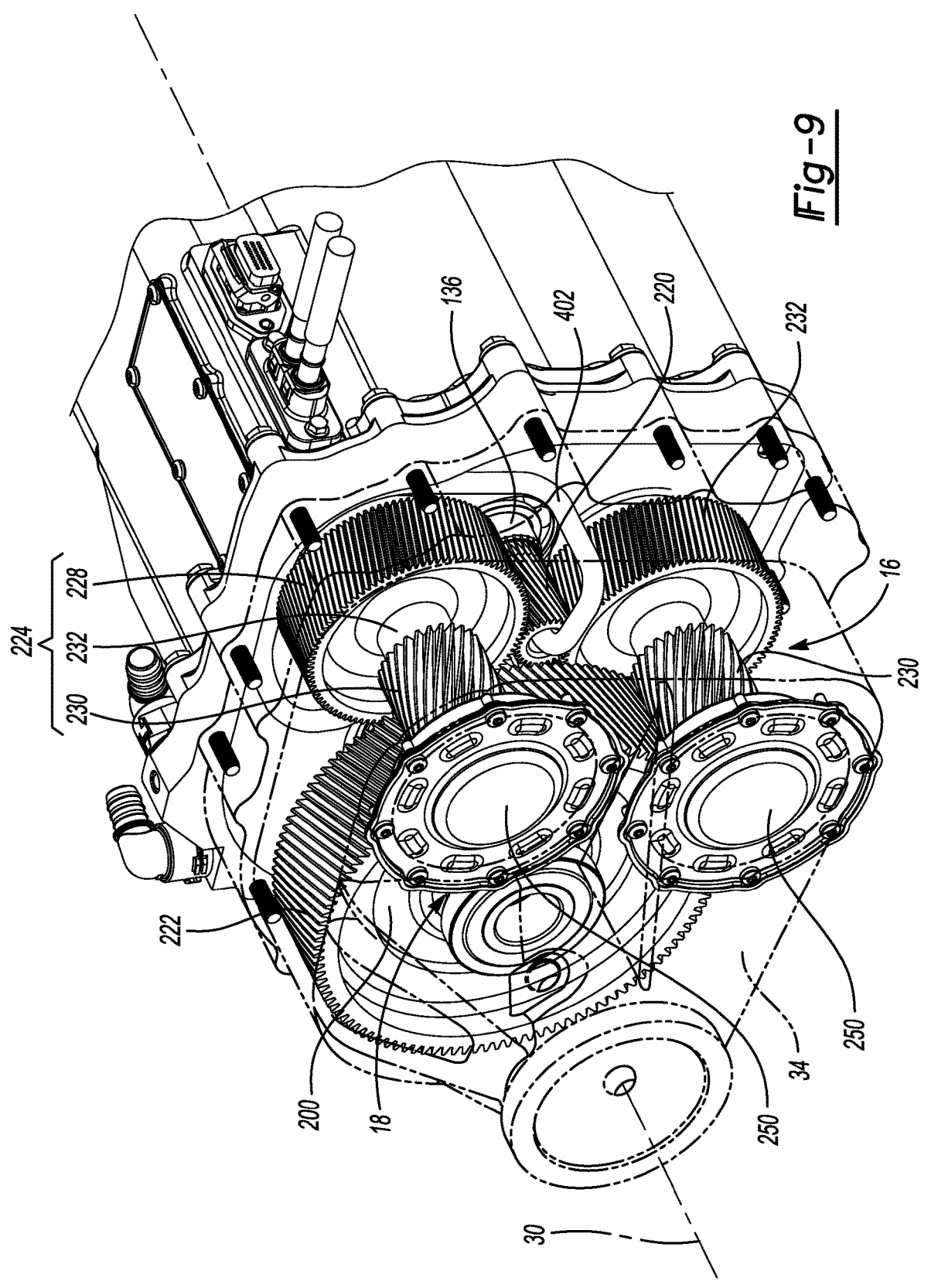
FIG. 9 is a perspective view of a portion of the electric drive unit of FIG. 1 illustrating a transmission in greater detail.
Figure 10:
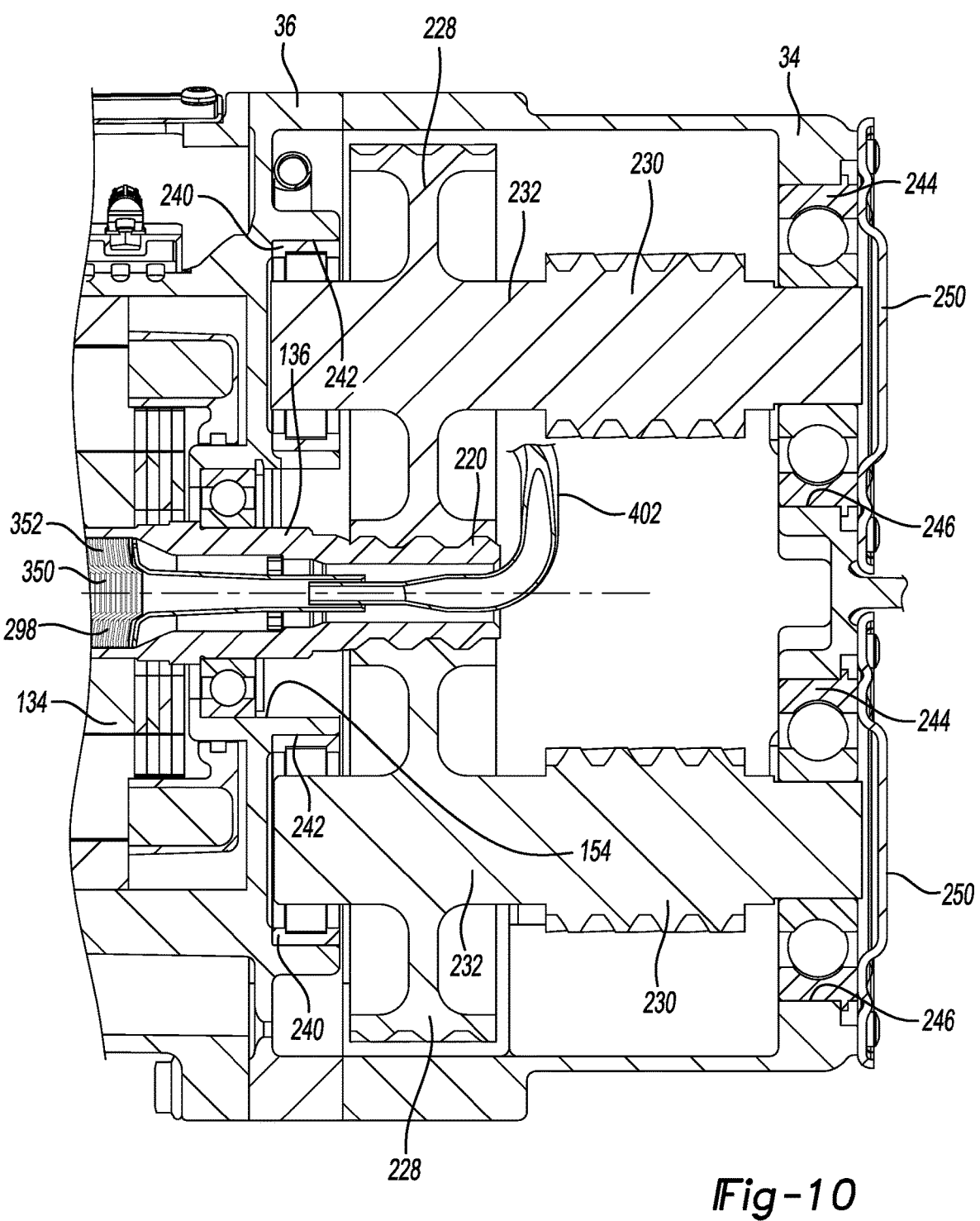
FIG. 10 is an enlarged portion of FIG. 4 illustrating the transmission and a portion of a lubrication and cooling system in more detail.

With reference to FIGS. 2B, 9 and 10, the transmission 16 can be configured in any desired manner to transmit rotary power between the motor output shaft 136 and the differential assembly 18. Generally, the transmission 16 includes a transmission input member 220, which is coupled to the motor output shaft 136 for rotation therewith, and a transmission output member 222 that is rotatable about the output axis 30 and coupled for rotation to the differential input member 200. In the example provided, the transmission input member 220 and the transmission output member 222 are helical gears and the transmission 16 further includes a pair of compound gears 224. Each of the compound gears 224 includes a first intermediate gear 228, which is meshingly engaged with the transmission input member 220, and a second intermediate gear 230 that is coupled to the first intermediate gear 228 for rotation therewith and meshingly engaged with the transmission output member 222. Each of the compound gears 224 can optionally include a shaft 232 that is rotationally coupled to an associated one of the compound gears 224. In the example provided, each shaft 232 is unitarily and integrally formed with an associated one of the second intermediate gears 230 and an associated one of the first intermediate gears 228. However, it will be appreciated that one or both of the first and second intermediate gears 228 and 230 could be formed as a discrete component that is assembled (e.g., press-fit, welded) to the shaft 232.

As best shown in FIG. 10, a first end of each shaft 232 can be supported by a first shaft bearing 240 that is mounted in a first bearing bore 242 that is formed in the intermediate housing member 36, while a second, opposite end of each shaft 232 can be supported by a second shaft bearing 244 that is mounted in a second bearing bore 246 that is formed in the second end cover 34. In the example provided, the second bearing bores 246 are formed through the second end cover 34 and a pair of bearing covers 250 are fixedly coupled to the second end cover 34 to close the ends of the second bearing bores 246 that are opposite the first bearing bore 242.

In FIG. 3, the first output shaft member 20 is coupled for rotation with a first one of the differential output members 202 and extends along the output axis 30 through the intermediate housing member 36 and the first end cover 32, and into the first axle tube 38. More specifically, the first output shaft member 20 extends through a first output shaft aperture 264, which is formed through the intermediate housing member 36 concentrically with the second differential bearing bore 212, the first cavity 62, a second output shaft aperture 266, which is formed through a wall on the first axle tube mount 54 that closes the first cavity 62, and the first tubular projection 64. The second output shaft member 22 is coupled for rotation with a second one of the differential output members 202 and extends along the output axis 30 through a wall on the second axle tube mount 74 that closes the second cavity 82, the second tubular projection 84 and the second axle tube 40. If desired, one or more bearings (not shown) can be employed to support each of the first and second output shaft members 20 and 22 for rotation about the output axis 30 relative to the housing assembly 12.

With reference to FIGS. 3, 10, 11 and 12, the lubrication and cooling system 24 can include a pump 290, a heat exchanger 292, a filter base 294, a filter 296 and optionally, a rotor heat exchanger 298. The pump 290 can be mounted to a pump mount 300 that is assembled to or incorporated in the intermediate housing member 36 at a location that is within the first cavity 62 but offset from the motor housing 130. A suction inlet (not specifically shown) of the pump 290 can be fluidly coupled to a suction conduit 308 in the pump mount 300 that can be formed through the intermediate housing member 36. Optionally, an inlet screen 310 can be coupled in fluid communication to an end of the suction conduit 308 that is opposite the pump 290. The inlet screen 310 can be fastened to the intermediate housing member 36 and can be disposed in the second cavity 82.

With reference to FIGS. 6, 7, 11 and 13, the heat exchanger 292 can be configured to cool a fluid that is employed to lubricate and/or cool various components of the electric drive unit 10. Any appropriate type of heat exchanger can be employed, but in the example provided, the heat exchanger 292 is a plate-and-frame type heat exchanger having a first passage (not specifically shown) and a second passage 322 that is not in fluid communication with the first passage. The first passage is configured to transmit a first fluid therethrough, such as a combination of water and ethylene glycol, while the second passage 322 is configured to transmit a second fluid, such as an oil-based fluid that is employed to lubricate and cool various components of the electric drive unit 10. The first passage can have an inlet, which can be fluidly coupled to an outlet 100*a* of the first fluid conduit 100 to receive a flow of the first fluid, and an outlet that can be fluidly coupled to an inlet 104*a* of the second fluid conduit 104 to discharge the flow of the first fluid.

Figure 11:
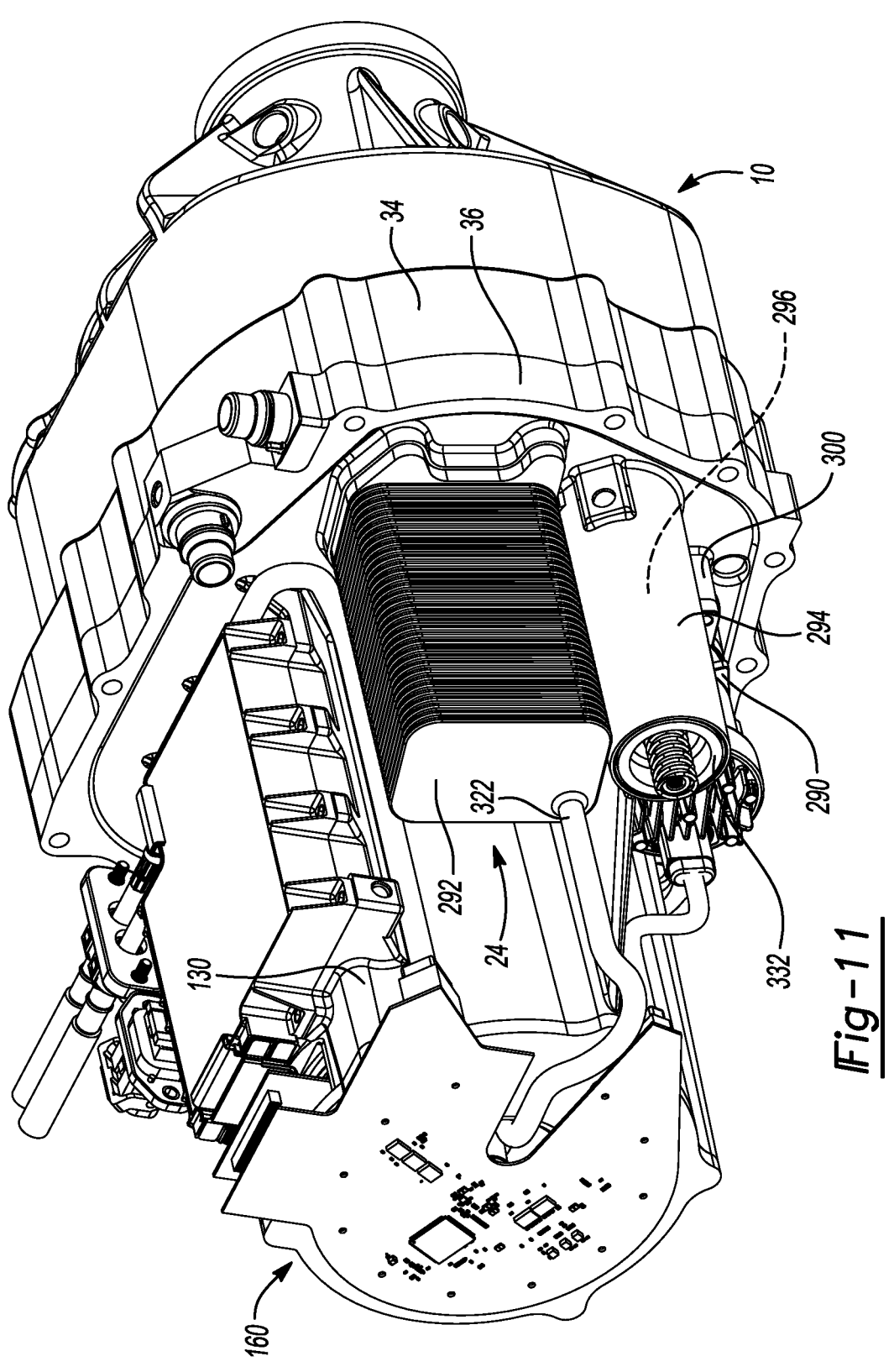
FIG. 11 is a perspective view of a portion of the electric drive unit of FIG. 1 with a first end cover removed from the intermediate housing member to better illustrate the lubrication and cooling system.
Figure 12:
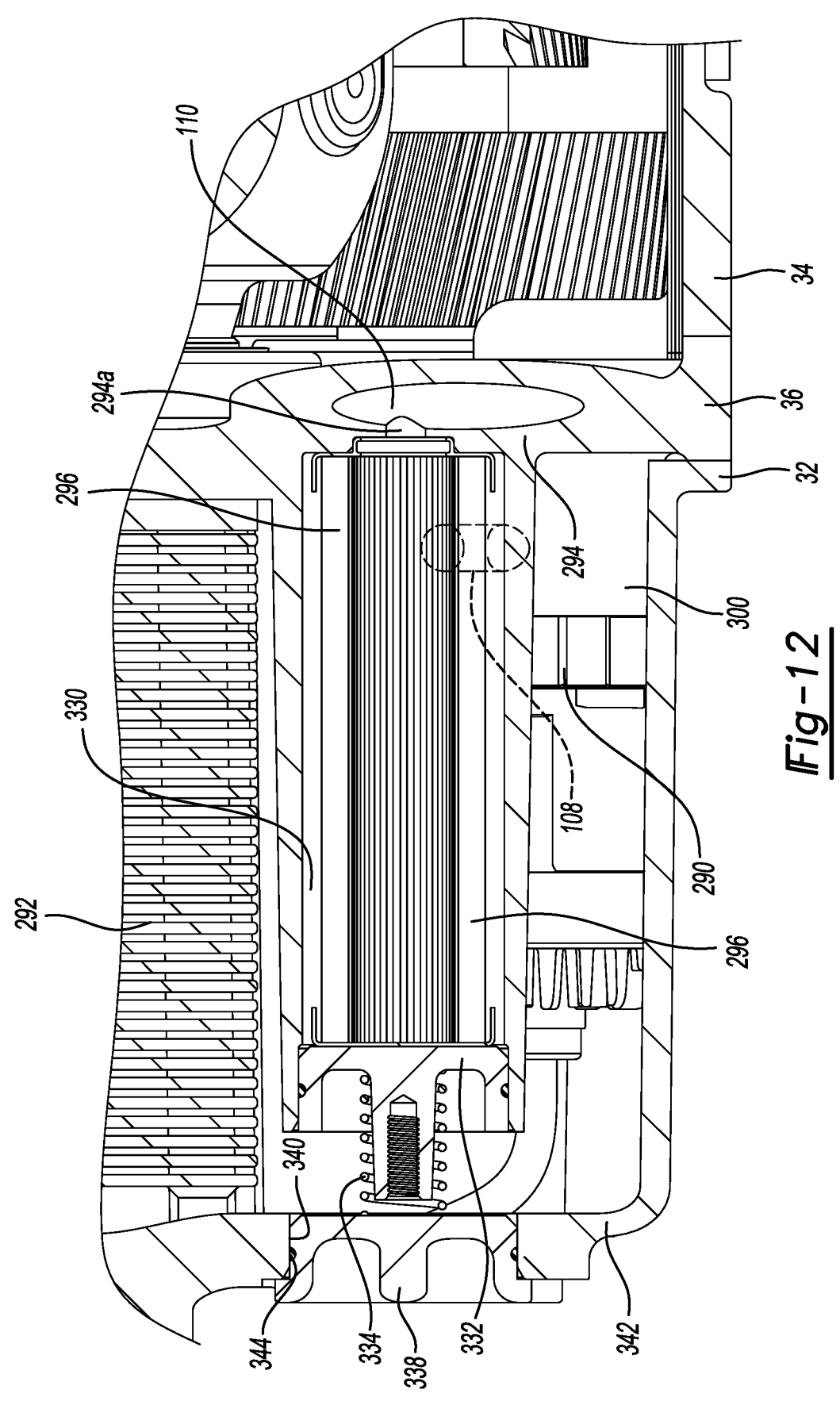
FIG. 12 is a section view of the electric drive unit of FIG. 1 taken through a portion of the lubrication and cooling system to illustrate a filter base and a filter in more detail.
Figure 13:
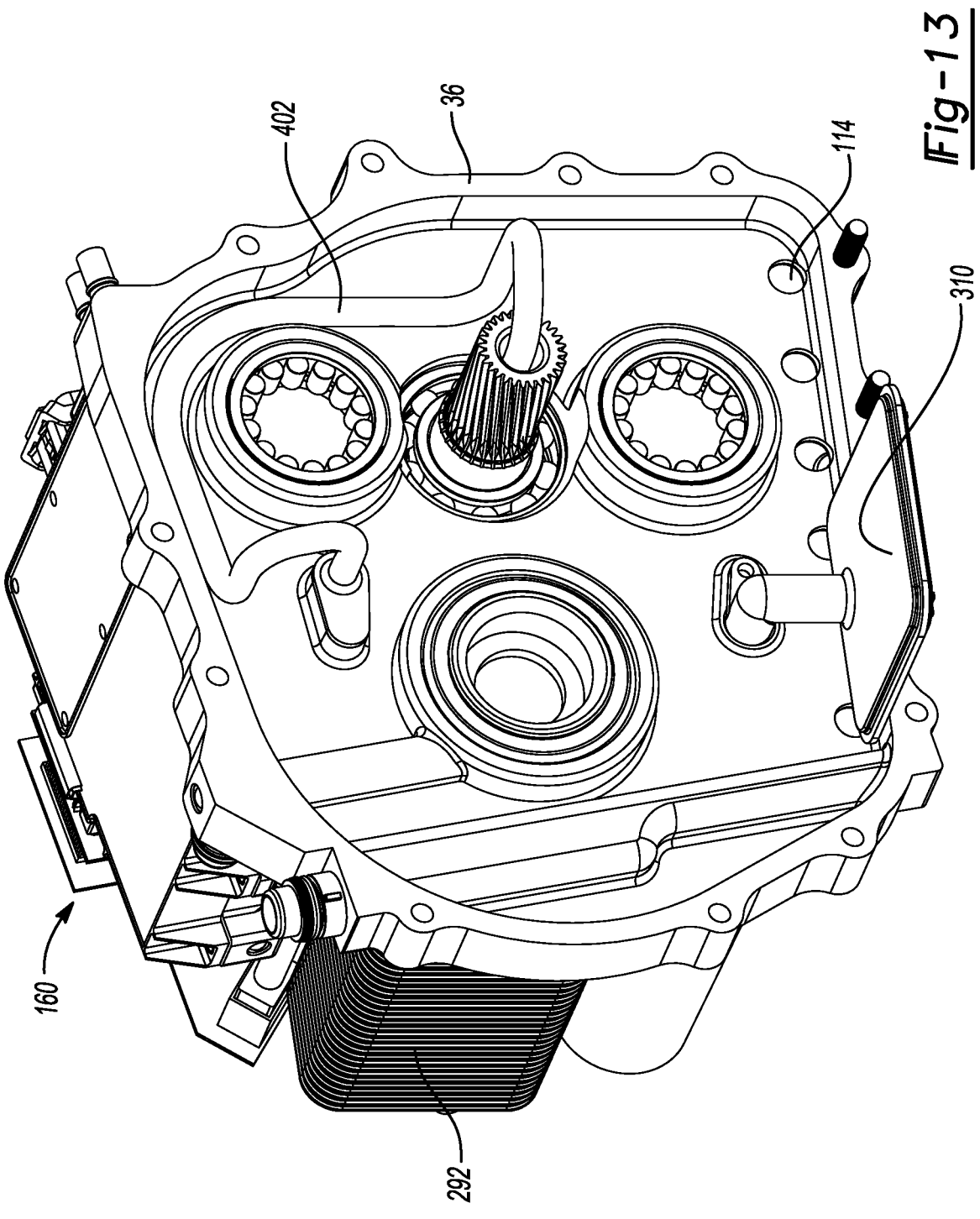
FIG. 13 is a perspective view of a portion of the electric drive unit of FIG. 1 illustrating the electric motor assembly and lubrication and cooling system as mounted to the intermediate housing member.

In FIGS. 6, 11 and 12, the filter base 294 can be fixedly coupled to (e.g., integrally and unitarily formed with) the intermediate housing member 36. The third fluid conduit 108 can fluidly couple an outlet of the pump 290 to an inlet of the filter base 294, while the fourth fluid conduit 110 can fluidly couple an outlet 294*a* of the filter base 294 to an inlet of the second passage 322 in the heat exchanger 292. The filter base 294 can define a filter cavity 330, which is configured to receive the filter 296 therein. It will be appreciated that fluid transmitted through the third fluid conduit 108 to the inlet of the filter base 294 will flow through the filter 296 and that the filtered fluid will be discharged from the filter base 294 into the fourth fluid conduit 110. In the example provided, the filter 296 is a cartridge-type filter that can be removed from the generally cylindrically-shaped filter cavity 330 in the filter base 294. A filter base plug 332 can be received into the filter cavity 330 and can cooperate with the filter base 294 to segregate the flow of fluid entering into and out of the filter 296. A spring 334 can optionally be disposed between the housing assembly 12 and the filter base plug 332 to urge the filter base plug 332 into abutment with the filter 296. Optionally, the housing assembly 12 can include a filter service cap 338 that can be removably coupled to the first end cover 32. In the example shown, the filter service cap 338 is threaded into an access hole 340 that is formed through a wall 342 in the first end cover 32. If desired, a seal member 344 can be employed to form a seal between the filter service cap 338 and the wall 342. The filter service cap 338 is disposed in-line with the filter 296 and is sized so that the filter 296 can be removed through the access hole 340 in the wall 342 when the filter service cap 338 is removed from the first end cover 32.

With reference to FIGS. 4, 9 and 10, the rotor heat exchanger 298 is disposed in the rotor 134 and can have a central coolant passage 350 and one or more return passages 352 that are disposed about the central coolant passage 350. Exemplary rotor heat exchangers 298 are disclosed in more detail in commonly assigned co-pending U.S. application Ser. No. 17/501,189 filed Oct. 14, 2021, and U.S. Provisional Patent Application No. 63/271,937 filed Oct. 26, 2021, the disclosures of which are incorporated by reference as if fully set forth in detail herein.

With reference to FIGS. 3, 7 and 11 through 13, the pump 290 is operated during the operation of the electric drive unit 10 to draw an oil-based fluid from a fluid sump S in the second cavity 82. It will be appreciated that the transfer ports 114 that are formed through the intermediate housing member 36 permit fluid communication between the first cavity 62 and the second cavity 82. The oil-based fluid that is drawn from the sump passes through the inlet screen 310 and the suction conduit 308 (in the intermediate housing member 36) before entering the pump 290. Pressurized fluid exiting the pump 290 is transmitted through the third fluid conduit 108 to the inlet of the filter base 294, passes through the filter 296 and then through the outlet 294*a* of the filter base 294 to the fourth fluid conduit 110. The fourth fluid conduit 110 transmits the pressurized fluid to the second passage 322 in the heat exchanger 292.

A cooling fluid is circulated through the first conduit 100 (in the intermediate housing member 36), the first passage in the heat exchanger 292 and then through the second conduit 104 (in the intermediate housing member 36) while the oil-based fluid is circulated through the second passage 322 in the heat exchanger 292 to cool the oil-based fluid as it passes through the heat exchanger 292. The oil-based fluid that is discharged from the second passage 322 is employed to cool the inverter 160.

With reference to FIGS. 4,8 and 14, the power semiconductors 180 in the inverter 160 can generate a significant amount of heat during the operation of the electric drive unit 10 and as such, the oil-based fluid is transmitted through the coolant passage 176 to permit heat to be rejected from the power semiconductors 180 (through the heat sinks 182) to the oil-based fluid. The second passage 322 is shown to directly discharge the oil-based fluid into the inverter 160, but it will be appreciated that a discrete fluid conduit (not shown) could be employed to couple an outlet of the second passage 322 that is formed by the heat exchanger 292 to the coolant passage 176. If desired, the coolant passage 176 can optionally be configured to pass around an axial end of the windings 146 of the stator 132 to provide additional cooling to the windings 146.

With reference to FIGS. 4, 7, 13 and 15, at least a portion of the oil-based fluid that is transmitted through the coolant passage 176 can optionally be transmitted into the stator coolant channels 148 to cool the stator 132. In the example provided, the oil-based fluid passing through the coolant passage 176 is directed to the stator coolant channels 148 such that the oil-based fluid passes longitudinally through the stator 132 toward the intermediate housing member 36. The oil-based fluid is discharged from the opposite axial end of the stator 132 (i.e., the axial end of the stator 132 that is proximate the intermediate housing member 36) and can collect in an annular chamber that is disposed about the axial ends of the windings 146 on this opposite axial ends of the stator 132. Fluid in this annular chamber is discharged through an aperture 400 that extends through the intermediate housing member 36 and can be directed into a rotor coolant conduit 402. The rotor coolant conduit 402 can be employed to direct the oil-based fluid into the central coolant passage 350 in the rotor heat exchanger 298. The oil-based fluid passes longitudinally through the rotor 134 to an opposite axial end of the rotor heat exchanger 298 and is directed radially outwardly into the return passage(s) 352, so that the oil-based fluid can pass longitudinally through the rotor heat exchanger 298 a second time. The oil-based fluid that is discharged from the rotor heat exchanger 298 can be routed through the housing assembly 12 to lubricate and/or cool various components of the electric drive unit 10, such as the transmission 16 and the differential assembly 18 (FIG. 3).

With reference to FIGS. 16 and 17, the first end cover 32 can optionally define a power connection port 420 and an access port 422. More specifically, the power connection port 420 and the access port 422 can be formed through the first perimeter wall member 52 to provide access to the first cavity 62. The power connection port 420 can provide access for a pair of power cable leads 430, which can be electrically coupled to a source of electrical power, such as a battery (not shown), to be inserted to the housing assembly 12 along an insertion axis 432 to engage a pair of motor power terminals 434 on the motor assembly 14 that are disposed in the first cavity 62. The access port 422 can provide access to the motor power terminals 434 in a location that is spaced apart from the power connection port 420. In the example provided, the access port 422 provides access to couple the power cable leads 430 to the motor power terminals 434 with threaded fasteners (not shown). The power cable leads 430 can be coupled to a connector housing 450 that can be secured to the first end cover 32 in any desired manner, such as a plurality of threaded fasteners that are received through the connector housing 450 and threaded to fastener apertures in the first end cover 32. An access cover 452 can be secured to the first end cover 32 with a plurality of threaded fasteners to cover the access port 422.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
a housing assembly that defines an output axis, the housing assembly having a first end cover, a second end cover, an intermediate housing member, a first axle tube and a second axle tube, the first end cover having a first perimeter wall member and a first axle tube mount, the first perimeter wall member defining a first cavity that is disposed about and extends longitudinally along the output axis, the first axle tube mount defining a first axle tube bore, the second end cover having a second perimeter wall member and a second axle tube mount, the second perimeter wall member defining a second cavity that is disposed about and extends longitudinally along the output axis, the second axle tube mount defining a second axle tube bore, the intermediate housing member being disposed between and being fixedly coupled to the first and second end covers, the first axle tube being received in the first axle tube bore and being fixedly coupled to the first axle tube mount, the second axle tube being received in the second axle tube bore and being fixedly coupled to the second axle tube mount;
a motor assembly having a motor housing, a stator, a rotor and a motor output shaft, the motor housing being fixedly coupled to the intermediate housing member and extending into the first cavity, the motor housing being spaced apart from the first perimeter wall member and the first axle tube mount, the motor housing defining a motor cavity, the stator being disposed in the motor cavity, the rotor being disposed in the stator for rotation relative to the stator about a motor axis, the motor output shaft being coupled to the rotor for rotation therewith, the motor output shaft extending through the intermediate housing member and into the second cavity;
a transmission disposed in the second cavity, the transmission having a transmission input member, which is coupled to the motor output shaft for rotation therewith, and a transmission output member that is rotatable about the output axis;
a differential assembly disposed in the second cavity, the differential assembly having a differential input member, which is coupled to the transmission output member for rotation therewith, and a pair of differential output members;
a first output shaft member received in the first axle tube and rotatably coupled to a first one of the pair of differential output members; and a second output shaft member received in the second axle tube and rotatably coupled to the other one of the pair of differential output members.

2. The electric drive unit of claim 1, wherein the intermediate housing member is integrally and unitarily formed with at least a portion of the motor housing.

3. The electric drive unit of claim 1, further comprising a lubricant and cooling system having a filter base, and wherein the intermediate housing member defines a fluid conduit that is in fluid communication with the filter base.

4. The electric drive unit of claim 3, wherein the filter base is integrally and unitarily formed with the intermediate housing member.

5. The electric drive unit of claim 3, wherein the filter base defines a filter cavity, wherein a filter cartridge is received in the filter cavity, and wherein a filter cap is received into an access hole that is formed in the first end cover, the filter cap being engaged to the first end cover, the access hole being disposed in-line with the filter cartridge, wherein the filter cartridge is removable through the access hole when the filter cap is removed from the first end cover.

6. The electric drive unit of claim 5, wherein the lubricant and cooling system includes a pump, and wherein the motor assembly further comprises a motor controller having an inverter, the inverter having a plurality of heat-sinked power semiconductors, the heat-sinked power semiconductors having one or more heat sinks that are disposed in a coolant passage that is coupled in fluid communication with the pump.

7. The electric drive unit of claim 6, wherein the stator has a stator body and a plurality of windings, wherein the stator body defines a plurality of stator coolant channels that are coupled in fluid communication with the coolant passage, and wherein at least a portion of the fluid discharged from the coolant passage is transmitted around an axial end of the windings to the stator coolant channels.

8. The electric drive unit of claim 7, wherein the lubricant and cooling system includes a rotor heat exchanger having a central coolant passage and one or more return passages that are disposed about the central coolant passage, and wherein a rotor coolant conduit fluidly couples the fluid conduit to the central coolant passage.

9. The electric drive unit of claim 1, wherein the transmission comprises a pair of compound gears, each compound gear having a first intermediate gear and a second intermediate gear, the first intermediate gear being meshingly engaged with the transmission input gear, the second intermediate gear being coupled to the first intermediate gear for rotation therewith, the second intermediate gear being meshingly engaged with the transmission output gear.

10. The electric drive unit of claim 9, wherein each of the compound gears comprises a shaft, wherein a first end of each shaft is supported by a first shaft bearing that is mounted in a first bearing bore that is formed in the intermediate housing member, wherein a second end of each shaft is supported by a second shaft bearing that is mounted in a second bearing bore that is formed in the second end cover.

11. The electric drive unit of claim 10, wherein the housing assembly further comprises a pair of bearing covers, each of the bearing covers being fixedly coupled to the second end cover to close an end of a respective one of the second bearing bores.

12. The electric drive unit of claim 1, wherein the first end cover defines a power connection port and an access panel, the power connection port providing access to a pair of motor power terminals on the motor assembly along a power cable insertion axis, the access panel providing access to the motor power terminals in a location that is spaced apart from the power connection port.

13. The electric drive unit of claim 1, wherein a plurality of transfer ports are formed through the intermediate housing member, the transfer ports permitting fluid communication between the first cavity and the second cavity.

14. An electric drive unit comprising:

a housing assembly that defines an output axis, the housing assembly having an intermediate housing member, a first axle tube and a second axle tube, the housing assembly defining a first cavity, and a second cavity that is segregated from the first cavity by the intermediate housing member;

a motor assembly having a motor housing, a stator, a rotor and a motor output shaft, the motor housing being fixedly coupled to the intermediate housing member and extending into the first cavity, the motor housing defining a motor cavity, the stator being disposed in the motor cavity, the rotor being disposed in the stator for rotation relative to the stator about a motor axis, the motor output shaft being coupled to the rotor for rotation therewith, the motor output shaft extending through the intermediate housing member and into the second cavity;

a transmission disposed in the second cavity, the transmission having a transmission input member, which is coupled to the motor output shaft for rotation therewith, and a transmission output member that is rotatable about the output axis;

a differential assembly disposed in the second cavity, the differential assembly having a differential input member, which is coupled to the transmission output member for rotation therewith, and a pair of differential output members;

a first output shaft member received in the first axle tube and rotatably coupled to a first one of the pair of differential output members; and a second output shaft member received in the second axle tube and rotatably coupled to the other one of the pair of differential output members;

wherein bending loads transmitted through the housing assembly along the output axis are not transmitted through the stator.

15. The electric drive unit of claim 14, wherein the intermediate housing member is integrally and unitarily formed with at least a portion of the motor housing.

16. The electric drive unit of claim 14, further comprising a lubricant and cooling system having a filter base, and wherein the intermediate housing member defines a first fluid conduit that is in fluid communication with the filter base.

17. The electric drive unit of claim 16, wherein the filter base is integrally and unitarily formed with the intermediate housing member.

18. The electric drive unit of claim 16, wherein the lubricant and cooling system includes a pump, and wherein the motor assembly further comprises a motor controller having an inverter, the inverter having a plurality of heat-sinked power semiconductors, the heat-sinked power semiconductors having one or more heat sinks that are disposed in a coolant passage that is in fluid communication with the pump.

19. The electric drive unit of claim 18, wherein the stator has a stator body and a plurality of windings, wherein the stator body defines a plurality of stator coolant channels that are coupled in fluid communication with the coolant passage, and wherein at least a portion of the fluid discharged from the coolant passage is transmitted around an axial end of the windings to the stator coolant channels.

20. The electric drive unit of claim 14, wherein a plurality of transfer ports are formed through the intermediate housing member, the transfer ports permitting fluid communication between the first cavity and the second cavity.

* * * * *